United States Patent Office 3,058,937
Patented Oct. 16, 1962

3,058,937
PROCESS FOR MAKING AN ACRYLONITRILE POLYMER SOLUTION EMPLOYING A REDUCING AGENT
Vera I. Furness, Coventry, England, assignor to Courtaulds Limited, London, England, a British company
No Drawing. Filed Oct. 17, 1957, Ser. No. 690,637
Claims priority, application Great Britain Nov. 16, 1956
3 Claims. (Cl. 260—29.6)

This invention relates to the production of solutions of polyacrylonitrile and to the production from such solutions of shaped articles such as threads, fibres, filaments, staple fibres, ribbons, films and the like, hereinafter generally referred to as "threads." The solutions with which the invention is concerned include solutions of simple polymers of acrylonitrile and copolymers containing at least 80 percent of acrylonitrile in the molecule, together with up to 20 percent of one or more other polymerisable compounds such as styrene, methyl acrylate and vinyl acetate, or dyeable additives such as vinyl pyridine.

The specification of Schmidt's application Serial No. 608,706 describes a process for the production of a solution of polyacrylonitrile as defined above which comprises dissolving acrylonitrile, together with the other copolymerisable compounds when such are used, in a concentrated solution of an inorganic thiocyanate and polymerising the monomer or monomers in solution in the presence of a non-oxidising polymerisation catalyst forming free radicals; examples of suitable catalysts mentioned in the specification are azo compounds.

When solutions are prepared in this way using azo catalysts there is a tendency for a yellow colour to develop in the solution and for this colour to persist in the threads eventually produced from the solution.

The object of this invention is to reduce this discolouration.

In accordance with this invention, the polymerisation is effected in a concentrated solution of an inorganic thiocyanate at a pH of 6.0 to 8.0 in the presence of an azo compound such as azo bis-isobutyronitrile and a reducing agent which is inert to the azo compound under the polymerising conditions.

Examples of suitable reducing agents for use in this invention are thiourea dioxide (otherwise known as formamidine sulphinic acid), formaldehyde, sodium formaldehyde sulphoxylate and sodium metabisulphite. It has been found that the pH value of the polymerisation mixture affects the efficacy of the reducing agent and according to the invention the pH should be kept within the range of 6.0 to 8.0 and preferably in the range of 6.5 to 7.0. Thus thiourea dioxide, formaldehyde and sodium formaldehyde sulphoxylate are satisfactory at pH values between 6.0 and 8.0, and sodium metabisulphite gives its optimum results at 7.0. Sodium hydrosulphite, which destroys azo catalysts at pH values above 7.0, can be used in the process of the invention at pH values between 6.0 and 7.0. The pH value of the polymerisation mixture when necessary may be adjusted by the addition of an acid such as acetic acid.

The reducing agent is preferably used in a proportion of from 1 to 3 percent based on the weight of the monomer or monomers.

Any of the azo catalysts described in Schmidt's application Serial No. 608,706 may be used although azo-bis-isobutyronitrile is the preferred catalyst. Thus other aliphatic azo compounds in which both nitrogens are attached directly to a carbon atom of an aliphatic chain, diazoamino compounds, diazosulphones, diazoanhydrides, diazonium compounds and azo disulphonates may be used. Specific examples of such catalysts are azo-bis-isobutyric acid esters, diazoamino benzene, phenyl-diazoamino-N-diethyl ethylene diamine, diazoamine tetrazole, p,p'-dinitro-diphenylazosulphone, diazoanhydride, potassium azodisulphonate and diazonium diphenylamine. The catalyst is used in the normal catalytic quantities for example from 0.5 to 5 percent by weight based on the weight of the monomers.

The thiocyanate solution in which polymerisation is effected may be an aqueous or aqueous alcoholic solution. The solution obtained may be spun directly into water, aqueous salt solution or aqueous alcoholic salt solutions as described in the above-mentioned Schmidt application.

The invention is illustrated by the following examples in which parts and percentages are by weight:

Example 1

520 parts of a 50 percent aqueous sodium thiocyanate solution in which had been dissolved 2 parts of thiourea dioxide, 92 parts of acrylonitrile, 8 parts of methyl acrylate, and 0.8 part of azo bis-isobutyronitrile were mixed together at 80° C. The solution, pH 6.5 to 7, was stirred at this temperature for 30 minutes. The solution obtained, after deaeration, was ready for spinning into a bath consisting of a solution of 15 parts of sodium thiocyanate dissolved in 85 parts of water, as described in Example 2 of Schmidt's application Serial No. 608,706. The solution was only slightly discoloured whereas the solution obtained by the same procedure in the absence of the thiourea dioxide was distinctly yellow.

Example 2

400 parts of a 50 percent aqueous sodium thiocyanate solution were heated to 85° C. with constant stirring in a vessel fitted with a reflex condenser. A mixture of 113 parts of acrylonitrile and 9 parts of methyl acrylate was stirred with 1 part of azo-bis-isobutyronitrile, 12 parts of 40 percent aqueous formaldehyde and 300 parts of 50 percent aqueous sodium thiocyanate solution; the pH of the mixture was then adjusted to 8.0 with sodium hydroxide solution. The mixture was then added over a period of 90 minutes to the stirred sodium thiocyanate solution, the temperature being maintained at 85–87° C. throughout the reaction. The polymer solution obtained had a colour number 30–40 percent of that obtained by a similar procedure but in the absence of formaldehyde.

Example 3

The procedure described in Example 1 was repeated but using 2 parts of sodium metabisulphite in place of the 2 parts of thiourea dioxide, the pH value being 7.0. An improvement in the colour of the solution was obtained.

Example 4

The procedure described in Example 1 was repeated but using 2 parts of sodium formaldehyde sulphoxylate in place of the 2 parts of thiourea dioxide, the pH value being 6.5 to 7.0. An improvement in the colour of the solution was obtained.

What I claim is:
1. A process for the production of a solution of a polymer of acrylonitrile containing at least 80% by weight of acrylonitrile in the polymer, which solution is capable of being extruded directly into a coagulating bath without previous precipitation, which comprises dissolving a substance consisting essentially of a polymerizable material selected from the group consisting of monomeric acrylonitrile and mixtures of acrylonitrile with styrene, methyl acrylate, vinyl acetate and a vinyl pyridine, said mixtures containing at least 80% acrylonitrile, in an aqueous solution containing a thiocyanate ion as the sole anionic component, and heating the solution so obtained at a pH in the range of from 6.0 to 8.0 to a temperature of at least 50° C., in the presence of (a) a catalyst selected from the group consisting of azo-bis-isobutyronitrile, azo-bis-isobutyric acid esters, diazoaminobenzene, phenyl-diazoamino-N-diethyl ethylene diamine, diazoaminotetrazole, p,p'-dinitro-diphenyl-azosulphone, diazoanhydride, potassium azo-disulphonate, diazonium diphenylamine and mixtures thereof as the sole polymerization catalyst and (b) from 1 to 3%, based on the weight of polymerizable material, of a reducing agent selected from the group consisting of thiourea dioxide, formaldehyde, sodium formaldehyde sulphoxylate and sodium metabisplphite, to polymerize said substance in said solution.

2. A process as claimed in claim 1 wherein the reducing agent is thiourea dioxide.

3. A process as claimed in claim 1 wherein the catalyst is azo-bis-isobutyronitrile.

References Cited in the file of this patent
UNITED STATES PATENTS

| | | |
|---|---|---|
| 2,140,921 | Rein | Dec. 20, 1938 |
| 2,380,476 | Stewart | July 31, 1945 |
| 2,486,241 | Arnold | Oct. 25, 1949 |
| 2,486,943 | Hammer et al. | Nov. 1, 1949 |
| 2,652,391 | Schulken et al. | Sept. 15, 1953 |
| 2,846,424 | Mino | Aug. 5, 1958 |
| 2,923,694 | Schmidt | Feb. 2, 1960 |